Apr. 24, 1923.
E. JOHNSON
AUTOMATIC STOP FOR WINDMILL PUMPS
Filed Jan. 7, 1922
1,453,142
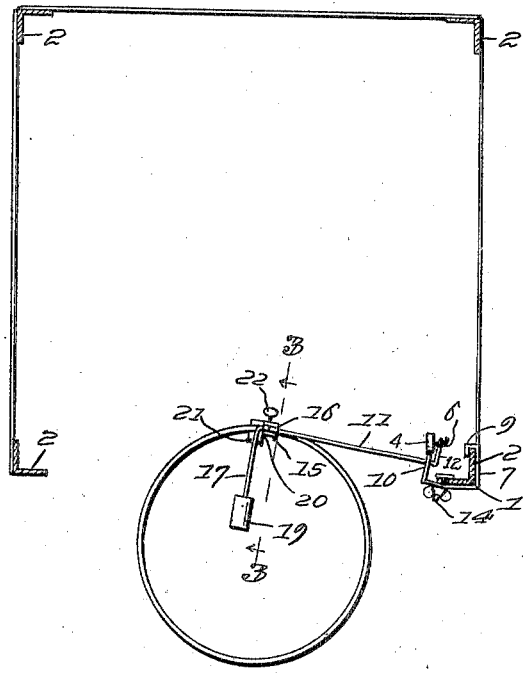
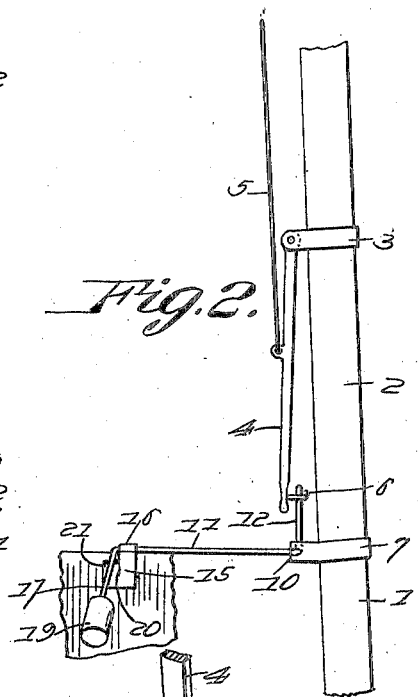
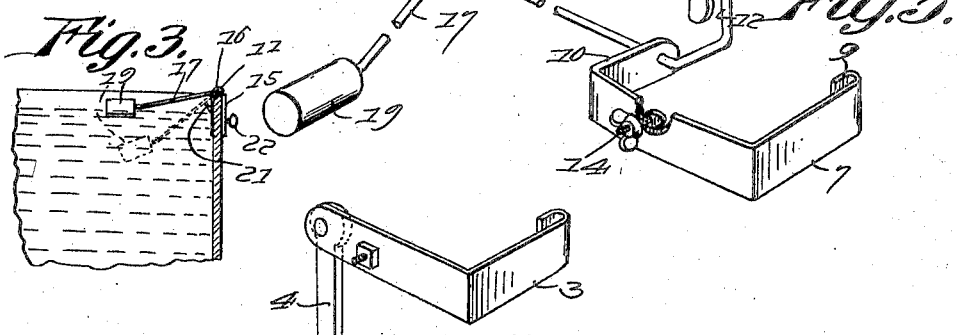
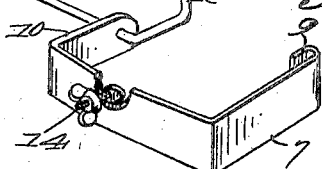
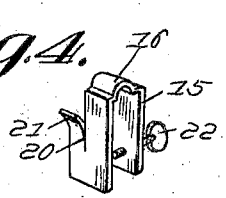
Inventor
Edwin Johnson,
By Watson E. Coleman
Attorney Patented Apr. 24, 1923.

1,453,142

UNITED STATES PATENT OFFICE.

EDWIN JOHNSON, OF OSNABROCK, NORTH DAKOTA.

AUTOMATIC STOP FOR WINDMILL PUMPS.

Application filed January 7, 1922. Serial No. 527,657.

*To all whom it may concern:*

Be it known that I, EDWIN JOHNSON, a citizen of the United States, residing at Osnabrock, in the county of Cavalier and State of North Dakota, have invented certain new and useful Improvements in Automatic Stops for Windmill Pumps, of which the following is a specification, reference being had to the accompanying drawings.

It is well known that as long as the windwheel of a windmill is in operative connection with the pump, the pump rod remains in operation, and very often the consumption of the water from the tank is less than the quantity supplied to the tank, and in this case the tank may overflow.

Therefore, the purpose of the present invention is to provide an automatic stop or regulator to prevent this overflow and stop the pump.

Most of the windmills utilize a clutch mechanism between the wind-wheel shaft and the pump, in combination with a lever and a tight wire connection with the clutch, for throwing the clutch in and out of gear, hence another purpose is to provide a float actuated device including a catch connection with the lever, so that when the level of the water in the tank reaches a certain height, the float is raised, the device is rocked, so that the catch connection may release, and since there is a tight wire connection between the lever and the clutch (not shown), but which is adapted to be spring tensioned, the lever is raised and the clutch automatically disengages, hence throwing the wind-wheel shaft out of gear, and thereby shutting off the flow of water to the tank.

Still another purpose is the provision of improved means for mounting the float actuated device in the tank.

A further purpose is the provision of improved means for operatively mounting the float actuated device on one of the standards or uprights of the windmill frame.

Additionally the invention aims to provide improved means for mounting the rock shaft on the tank including means to limit the downward movement of the float arm of the rock shaft.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view showing the four angle irons of a windmill frame in section, and illustrating the improved automatic stop as applied;

Figure 2 is a fragmentary elevational view of the device shown in Figure 1;

Figure 3 is a sectional view on line 3—3 of Figure 1;

Figure 4 is a detail perspective view of the clamp 15;

Figure 5 is a detail perspective view of the support 7;

Figure 6 is a detail perspective view of the support 3.

Referring to the drawings, 1 designates a windmill frame, which is constructed of angle iron standards 2. A suitable clamp or support 3 is mounted upon one of the standards 2, and to which is pivoted a lever 4, which has a tight wire connection 5 with the clutch (not shown) of the windmill shaft (not shown), which shaft is adapted to be connected to the pump rod (not shown). The extremity of the lever 4 has a screw hook 6, and mounted upon the standard (which carries the clamp 3) is a clamp 7. This clamp 7 is angular, and one arm thereof has a hook 9 to engage one of the flanges of the standard, and mounted in a bearing of an extension 10 of the clamp 7 is a rocking shaft 11 provided with a crank arm 12. The clamp 7 is secured upon the standard by means of a bolt or screw 14, so as to assist in supporting the shaft 11, and the crank arm 12 is designed to engage the screw hook 6, when the lever is set. A suitable support 15 which straddles the edge of the wall of the tank, is constructed of spring sheet metal, which is bent U-form, in order that it may straddle the wall of the tank. The transverse portion of this support 15 is pressed outwardly as shown at 16, to provide a bearing for the rock shaft 11. The shaft 11 has a lateral arm 17, which carries a float 19. One arm of the support 15 is slitted as at 20 to provide a lateral tongue 21. This tongue 21 is disposed in a path beneath the arm 17, so as to limit the arm in its downward movement when the level of the water lowers. A suitable set bolt or screw 22 engages through the other arm of the support 15 and engages the wall to secure and hold the support in place. The clamps 3 and 7 are similarly constructed, due to the fact that they conform to and connect with the same construction of standard.

In the operation of the device, the lever 4 is pulled downwardly on its pivot, causing the tight wire connection 5 to move the clutch (not shown) in gear, whereby the wind-wheel shaft may impart movements to the pump rod (not shown). The float 18 of the arm 17 in this instance is in its lowered position, and in this case the crank arm 12 is engaged with the screw hook 6, thereby holding the clutch (not shown) in gear. However, as soon as the level of the water reaches a position to apply a lifting power to the float, the rocking shaft 11 is rocked sufficiently to cause the crank arm 12 to disengage from the screw hook 6, and allowing the wire 5 to be automatically operated to swing the lever 4 inwardly and upwardly to released position.

The invention having been set forth, what is claimed is:—

1. In combination with a windmill tank or reservoir and a windmill frame including a plurality of uprights, an elongated shaft journaled in a horizontal position and extending from an upper edge of the tank to a point adjacent one of the uprights, means carried by said one upright in which the adjacent end of said shaft is journaled for supporting the shaft from the upright, means carried by the tank in which the other end of said shaft is journaled, a lever swingingly mounted upon said one upright and depending toward said shaft, said lever being adapted to swing in a plane parallel with the longitudinal axis of said shaft and having a lateral hook upon its lower end, said shaft having a crank arm extending upwardly for engagement with said hook to hold the lever in lowered position, means for connecting the lever with the operating mechanism of a windmill, and a lateral arm upon one end of the shaft provided with a float on its free end movable by the rise of fluid in the tank for rocking said shaft to disengage the crank arm from the hook on the lever.

2. In combination with a windmill tank or reservoir and a windmill frame including an upright, of a depending lever pivoted on the upright above the tank, a float associated with the tank so as to be raised by the rise of fluid therein, an arm having connection with said lever to hold the lever in lowered position, and operative connections between said arm and said float whereby the arm is released upon rising of the float, and means for connecting the lever with the operating mechanism of a windmill.

3. In combination with a windmill tank or reservoir and a windmill frame including an upright, of a depending lever pivoted on the upright above the tank, a float associated with the tank so as to be raised by the rise of fluid therein, an arm having connection with said lever to hold the lever in lowered position, and operative connections between said arm and said float whereby the arm is released upon rising of the float, and means for connecting the lever with the operating mechanism of a windmill, said operative connections between the float and arm including a rock shaft journaled in a horizontal position and extending from the tank to the upright of the windmill frame.

4. In combination with a windmill tank or reservoir and a windmill frame including an upright, of a depending lever pivoted on the upright above the tank, a float associated with the tank so as to be raised by the rise of fluid therein, an arm having connection with said lever to hold the lever in lowered position, and operative connections between said arm and said float whereby the arm is released upon rising of the float, and means for connecting the lever with the operating mechanism of a windmill, said operative connections between the float and arm including a rock shaft journaled in a horizontal position and extending from the tank to the upright of the windmill frame, and clamps detachably engaging the upright and tank and provided with bearings in which the shaft is journaled.

In testimony whereof I hereunto affix my signature.

EDWIN JOHNSON.